(12) United States Patent
Dunn

(10) Patent No.: US 12,730,339 B2
(45) **Date of Patent: *Sep. 8, 2026**

(54) DISPLAY UNIT WITH MONITORING FEATURES

(71) Applicant: Manufacturing Resources International, Inc., Alpharetta, GA (US)

(72) Inventor: William Dunn, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/357,604

(22) Filed: Oct. 14, 2025

(65) Prior Publication Data

US 2026/0036841 A1 Feb. 5, 2026

Related U.S. Application Data

(63) Continuation of application No. 19/173,174, filed on Apr. 8, 2025, which is a continuation of application (Continued)

(51) Int. Cl.

*G09G 3/34* (2006.01)
*G01C 9/06* (2006.01)

(Continued)

(52) U.S. Cl.

CPC ......... *G02F 1/133382* (2013.01); *G01C 9/06* (2013.01); *G04G 9/0064* (2013.01);

(Continued)

(58) Field of Classification Search

CPC .. G02F 1/133382; G01C 9/06; G04G 9/0064; G04G 21/02; G09G 3/3406; G09G 2320/041; G09G 2330/021

See application file for complete search history.

(56) References Cited

U.S. PATENT DOCUMENTS 3,504,528 A 4/1970 Weinberg et al.
3,807,220 A 4/1974 Ottenstein et al.

(Continued)

FOREIGN PATENT DOCUMENTS

CN 203277867 U 11/2013
CN 110441008 A 11/2019

(Continued)

OTHER PUBLICATIONS

Photo Research, Inc., PR®-650 SpectraScan® Colorimeter, 1999, 2 pages.

(Continued)

*Primary Examiner* — Robert J Michaud

(74) *Attorney, Agent, or Firm* — Standley Law Group LLP; Jeffrey S. Standley; Adam J. Smith

(57) ABSTRACT

Display assemblies with monitoring features, along with related systems and methods, are disclosed. The display assembly includes a display unit having an electronic display movably mounted to a frame. A controller includes an orientation detection device in connection with a processor. The controller receives data from the orientation detection device and determines, from time to time, a state of the display assembly based, at least in part, on data received from the orientation detection device.

19 Claims, 5 Drawing Sheets

Related U.S. Application Data

No. 18/795,279, filed on Aug. 6, 2024, now Pat. No. 12,298,614, which is a continuation of application No. 18/654,191, filed on May 3, 2024, now Pat. No. 12,117,684, which is a continuation of application No. 18/377,401, filed on Oct. 6, 2023, now Pat. No. 12,007,637, which is a continuation of application No. 17/983,144, filed on Nov. 8, 2022, now Pat. No. 11,815,755, which is a continuation of application No. 17/201,933, filed on Mar. 15, 2021, now Pat. No. 11,526,044.

(60) Provisional application No. 63/000,612, filed on Mar. 27, 2020.

(51) Int. Cl.
*G02F 1/1333* (2006.01)
*G04G 9/00* (2006.01)
*G04G 21/02* (2010.01)

(52) U.S. Cl.
CPC ........... *G04G 21/02* (2013.01); *G09G 3/3406* (2013.01); *G09G 2320/041* (2013.01); *G09G 2330/021* (2013.01)

(56) References Cited

U.S. PATENT DOCUMENTS 4,527,804 A 7/1985 Spencer
5,162,785 A 11/1992 Fagard
5,168,961 A 12/1992 Schneider
5,228,339 A 7/1993 Maresca, Jr. et al.
5,322,051 A 6/1994 Patterson et al.
5,351,201 A 9/1994 Harshbarger, Jr. et al.
5,590,831 A 1/1997 Manson et al.
5,751,346 A 5/1998 Dozier et al.
5,786,801 A 7/1998 Ichise
5,952,992 A 9/1999 Helms
6,042,443 A 3/2000 Carella et al.
6,144,359 A 11/2000 Grave
6,157,143 A 12/2000 Bigio et al.
6,158,692 A 12/2000 Abild et al.
6,215,411 B1 4/2001 Gothard
6,222,841 B1 4/2001 Taniguchi
6,259,492 B1 7/2001 Imoto et al.
6,374,187 B1 4/2002 Knight et al.
6,384,736 B1 5/2002 Gothard
6,421,694 B1 7/2002 Nawaz et al.
6,509,911 B1 1/2003 Shimotono
6,526,807 B1 3/2003 Doumit et al.
6,546,294 B1 4/2003 Kelsey et al.
6,553,336 B1 4/2003 Johnson et al.
6,556,258 B1 4/2003 Yoshida et al.
6,587,525 B2 7/2003 Jeong et al.
6,701,143 B1 3/2004 Dukach et al.
6,753,842 B1 6/2004 Williams et al.
6,771,795 B1 8/2004 Isnardi
6,812,851 B1 11/2004 Dukach et al.
6,821,179 B2 11/2004 Ando
6,850,209 B2 2/2005 Mankins et al.
6,955,170 B1 10/2005 Mullins et al.
6,968,375 B1 11/2005 Brown
7,007,545 B1 3/2006 Martinek
7,064,672 B2 6/2006 Gothard
7,319,862 B1 1/2008 Lincoln et al.
7,330,002 B2 2/2008 Joung
7,380,265 B2 5/2008 Jensen et al.
7,391,317 B2 6/2008 Abraham et al.
7,451,332 B2 11/2008 Culbert et al.
7,474,294 B2 1/2009 Leo et al.
7,516,223 B2 4/2009 Whitehead
7,577,458 B2 8/2009 Lin
7,581,094 B1 8/2009 Apostolopoulos et al.
7,595,785 B2 9/2009 Jang
7,612,278 B2 11/2009 Sitrick et al.
7,636,927 B2 12/2009 Zigmond et al.
7,658,787 B2 2/2010 Morse et al.
7,675,862 B2 3/2010 Pham et al.
7,679,279 B2 3/2010 Kamio et al.
7,751,813 B2 7/2010 Varanda
7,764,280 B2 7/2010 Shiina
7,774,633 B1 8/2010 Harrenstien et al.
7,795,821 B2 9/2010 Jun
7,882,728 B2 2/2011 Kizaki et al.
7,889,852 B2 2/2011 Whitehead
7,949,893 B1 5/2011 Knaus et al.
8,074,627 B2 12/2011 Siddiqui et al.
8,212,921 B2 7/2012 Yun
8,218,812 B2 7/2012 Sugimoto et al.
8,248,203 B2 8/2012 Hanwright et al.
8,336,369 B2 12/2012 Mahoney
8,441,574 B2 5/2013 Dunn et al.
8,483,554 B2 7/2013 Takimoto et al.
8,601,252 B2 12/2013 Mendelow et al.
8,612,608 B2 12/2013 Whitehead
8,654,302 B2 2/2014 Dunn et al.
8,689,343 B2 4/2014 De Laet
8,767,165 B2 7/2014 Dunn
8,854,595 B2 10/2014 Dunn
8,881,576 B2 11/2014 Schwartz et al.
9,026,686 B2 5/2015 Dunn et al.
9,147,194 B1 9/2015 Le et al.
9,363,262 B1 6/2016 Wilkes
9,760,151 B1 9/2017 Hou
10,170,076 B2 1/2019 Wang et al.
10,174,519 B1 1/2019 Carpenter et al.
10,311,763 B2 6/2019 Greenfield
10,578,658 B2 3/2020 Dunn et al.
10,593,175 B1 3/2020 Jennings et al.
11,131,453 B2 9/2021 Kim et al.
11,402,940 B2 8/2022 Dunn
11,645,029 B2 5/2023 Newnham et al.
11,803,344 B2 10/2023 Newnham et al.
11,965,804 B2 4/2024 Dunn et al.
11,972,672 B1 4/2024 Dunn
12,393,241 B1 8/2025 Dunn et al.
2002/0019933 A1 2/2002 Friedman et al.
2002/0026354 A1 2/2002 Shoji et al.
2002/0065046 A1 5/2002 Mankins et al.
2002/0112026 A1 8/2002 Fridman et al.
2002/0120721 A1 8/2002 Eilers et al.
2002/0147648 A1 10/2002 Fadden et al.
2002/0152425 A1 10/2002 Chaiken et al.
2002/0163513 A1 11/2002 Tsuji
2002/0163916 A1 11/2002 Oskouy et al.
2002/0164962 A1 11/2002 Mankins et al.
2002/0190972 A1 12/2002 Ven de Van
2002/0194365 A1 12/2002 Jammes
2002/0194609 A1 12/2002 Tran
2003/0031128 A1 2/2003 Kim et al.
2003/0039312 A1 2/2003 Horowitz et al.
2003/0061316 A1 3/2003 Blair et al.
2003/0097497 A1 5/2003 Esakov
2003/0098881 A1 5/2003 Nolte et al.
2003/0115591 A1 6/2003 Weissmueller, Jr. et al.
2003/0117714 A1 6/2003 Nakamura et al.
2003/0132514 A1 7/2003 Liebeskind
2003/0161354 A1 8/2003 Bader et al.
2003/0177269 A1 9/2003 Robinson et al.
2003/0192060 A1 10/2003 Levy
2003/0196208 A1 10/2003 Jacobson
2003/0214242 A1 11/2003 Berg-johansen
2003/0230991 A1 12/2003 Muthu et al.
2004/0036697 A1 2/2004 Kim et al.
2004/0138840 A1 7/2004 Wolfe
2004/0158872 A1 8/2004 Kobayashi
2004/0194131 A1 9/2004 Ellis et al.
2004/0210419 A1 10/2004 Wiebe et al.
2004/0243940 A1 12/2004 Lee et al.
2004/0252400 A1 12/2004 Blank et al.
2004/0253947 A1 12/2004 Phillips et al.
2004/0255848 A1 12/2004 Yudasaka
2005/0033840 A1 2/2005 Nisani et al.

(56) References Cited

U.S. PATENT DOCUMENTS

2005/0070335 A1 3/2005 Jitsuishi et al.
2005/0071252 A1 3/2005 Henning et al.
2005/0073518 A1 4/2005 Bontempi
2005/0088984 A1 4/2005 Chin et al.
2005/0123001 A1 6/2005 Craven et al.
2005/0132036 A1 6/2005 Jang et al.
2005/0179554 A1 8/2005 Lu
2005/0216939 A1 9/2005 Corbin
2005/0231457 A1 10/2005 Yamamoto et al.
2005/0258921 A1 11/2005 Puskar et al.
2005/0267943 A1 12/2005 Castaldi et al.
2005/0289061 A1 12/2005 Kulakowski et al.
2005/0289588 A1 12/2005 Kinnear
2006/0007107 A1 1/2006 Ferguson
2006/0022616 A1 2/2006 Furukawa et al.
2006/0150222 A1 7/2006 McCafferty et al.
2006/0160614 A1 7/2006 Walker et al.
2006/0269216 A1 11/2006 Wiemeyer et al.
2007/0039028 A1 2/2007 Bar
2007/0154060 A1 7/2007 Sun
2007/0157260 A1 7/2007 Walker
2007/0168539 A1 7/2007 Day
2007/0200513 A1 8/2007 Ha et al.
2007/0214812 A1 9/2007 Wagner et al.
2007/0237636 A1 10/2007 Hsu
2007/0268241 A1 11/2007 Nitta et al.
2007/0273519 A1 11/2007 Ichikawa et al.
2007/0274400 A1 11/2007 Murai et al.
2007/0286107 A1 12/2007 Singh et al.
2007/0291198 A1 12/2007 Shen
2008/0008471 A1 1/2008 Dress
2008/0019147 A1 1/2008 Erchak et al.
2008/0024268 A1 1/2008 Wong et al.
2008/0034205 A1 2/2008 Alain et al.
2008/0037466 A1 2/2008 Ngo et al.
2008/0037783 A1 2/2008 Kim et al.
2008/0055297 A1 3/2008 Park
2008/0104631 A1 5/2008 Krock et al.
2008/0111958 A1 5/2008 Kleverman et al.
2008/0112601 A1 5/2008 Warp
2008/0136770 A1 6/2008 Peker et al.
2008/0163291 A1 7/2008 Fishman et al.
2008/0185976 A1 8/2008 Dickey et al.
2008/0218501 A1 9/2008 Diamond
2008/0246871 A1 10/2008 Kupper et al.
2008/0266554 A1 10/2008 Sekine et al.
2008/0267328 A1 10/2008 Ianni et al.
2008/0278099 A1 11/2008 Bergfors et al.
2008/0281165 A1 11/2008 Rai et al.
2008/0303918 A1 12/2008 Keithley
2008/0313691 A1 12/2008 Cholas et al.
2009/0009997 A1 1/2009 Sanfilippo et al.
2009/0015400 A1 1/2009 Breed
2009/0034283 A1 2/2009 Albright et al.
2009/0036190 A1 2/2009 Brosnan et al.
2009/0079416 A1 3/2009 Vinden et al.
2009/0104989 A1 4/2009 Williams et al.
2009/0129556 A1 5/2009 Ahn
2009/0152445 A1 6/2009 Gardner, Jr.
2009/0164615 A1 6/2009 Akkanen
2009/0273568 A1 11/2009 Milner
2009/0315867 A1 12/2009 Sakamoto et al.
2010/0017526 A1 1/2010 Jagannath et al.
2010/0037274 A1 2/2010 Meuninck et al.
2010/0060550 A1 3/2010 McGinn et al.
2010/0083305 A1 4/2010 Acharya et al.
2010/0117579 A1* 5/2010 Culbert .................... G06F 1/20 318/471
2010/0149567 A1 6/2010 Kanazawa et al.
2010/0177157 A1 7/2010 Stephens et al.
2010/0177158 A1 7/2010 Walter
2010/0177750 A1 7/2010 Essinger et al.
2010/0198983 A1 8/2010 Monroe et al.
2010/0226091 A1 9/2010 Dunn
2010/0231563 A1 9/2010 Dunn et al.
2010/0237697 A1 9/2010 Dunn et al.
2010/0299556 A1 11/2010 Taylor et al.
2011/0019636 A1 1/2011 Fukuoka et al.
2011/0047567 A1 2/2011 Zigmond et al.
2011/0058326 A1 3/2011 Idems et al.
2011/0078536 A1 3/2011 Han et al.
2011/0173853 A1 7/2011 Leveque
2011/0283199 A1 11/2011 Schuch et al.
2012/0105424 A1 5/2012 Lee et al.
2012/0203872 A1 8/2012 Luby et al.
2012/0302343 A1 11/2012 Hurst et al.
2012/0308191 A1 12/2012 Chung et al.
2013/0007110 A1 1/2013 Centner
2013/0162908 A1 6/2013 Son et al.
2013/0173358 A1 7/2013 Pinkus
2013/0282154 A1 10/2013 Chappell et al.
2014/0002747 A1 1/2014 Macholz
2014/0009893 A1 1/2014 Lai
2014/0172174 A1 6/2014 Poss et al.
2014/0230526 A1 8/2014 Willemin et al.
2014/0287671 A1 9/2014 Slessman
2015/0169827 A1 6/2015 LaBorde
2015/0193074 A1 7/2015 Cudak et al.
2015/0235426 A1* 8/2015 Lyons .................... A63F 13/26 345/8
2015/0250021 A1 9/2015 Stice et al.
2015/0316944 A1 11/2015 Thellend
2016/0034240 A1 2/2016 Kreiner et al.
2016/0112521 A1 4/2016 Lawson et al.
2016/0125468 A1 5/2016 Staneluis et al.
2016/0125772 A1 5/2016 Li et al.
2016/0256021 A1 9/2016 Jolin et al.
2016/0292744 A1 10/2016 Strimaitis et al.
2016/0358530 A1 12/2016 Schuch et al.
2017/0075777 A1 3/2017 Dunn et al.
2017/0082433 A1 3/2017 Huo et al.
2017/0083043 A1 3/2017 Bowers et al.
2017/0091822 A1 3/2017 Tian et al.
2017/0138814 A1 5/2017 Dempsey et al.
2017/0163519 A1 6/2017 Bowers et al.
2017/0219457 A1 8/2017 Keil et al.
2017/0242502 A1 8/2017 Gray et al.
2017/0242534 A1 8/2017 Gray
2017/0256051 A1 9/2017 Dwivedi et al.
2017/0315886 A1 11/2017 Helmick et al.
2018/0027635 A1 1/2018 Roquemore, III
2018/0080670 A1 3/2018 Carlyon et al.
2018/0089717 A1 3/2018 Morin et al.
2018/0128708 A1 5/2018 Cirino
2018/0181091 A1 6/2018 Funk et al.
2018/0268783 A1 9/2018 Woo
2018/0284758 A1 10/2018 Cella et al.
2018/0306052 A1 10/2018 Lammers et al.
2018/0314103 A1 11/2018 Dunn et al.
2019/0087042 A1 3/2019 Van Ostrand et al.
2019/0096202 A1 3/2019 Seelman
2019/0122082 A1 4/2019 Cuban et al.
2019/0171331 A1 6/2019 Gray et al.
2019/0367148 A1 12/2019 Kehlenbeck et al.
2020/0012383 A1 1/2020 Wang et al.
2020/0019363 A1 1/2020 Newnham et al.
2020/0250611 A1* 8/2020 Pourteymour .......... G06F 9/542
2020/0272269 A1 8/2020 Dunn
2021/0174715 A1 6/2021 Holloway et al.
2021/0397292 A1 12/2021 Dunn
2022/0147168 A1 5/2022 Lee et al.
2022/0260872 A1 8/2022 Dunn et al.
2023/0029615 A1 2/2023 Dunn et al.
2023/0032626 A1 2/2023 Brown
2023/0048815 A1 2/2023 Newnham et al.
2023/0052966 A1 2/2023 Newnham et al.
2023/0160774 A1 5/2023 Dunn et al.
2023/0384277 A1 11/2023 Dunn et al.
2024/0144806 A1 5/2024 Dunn

(56) References Cited

U.S. PATENT DOCUMENTS

2024/0201040 A1 6/2024 Dunn et al.
2025/0149005 A1 5/2025 Dunn et al.

FOREIGN PATENT DOCUMENTS

| | | | |
|---|---|---|---|
| CN | 114503233 | A | 5/2022 |
| CN | 217384567 | U | 9/2022 |
| EP | 0313331 | B1 | 2/1994 |
| EP | 1628087 | A1 | 2/2006 |
| EP | 1821538 | A1 | 8/2007 |
| EP | 2351369 | A2 | 8/2011 |
| JP | 61-234690 | A | 10/1986 |
| JP | 61-251901 | A | 11/1986 |
| JP | 7-74224 | A | 3/1995 |
| JP | 2000122575 | A | 4/2000 |
| JP | 3080628 | B2 | 8/2000 |
| JP | 2002064842 | A | 2/2002 |
| JP | 2002209230 | A | 7/2002 |
| JP | 2005-211449 | A | 8/2005 |
| JP | 2005-211451 | A | 8/2005 |
| JP | 2005236469 | A | 9/2005 |
| JP | 2005333568 | A | 12/2005 |
| JP | 2010282109 | A | 12/2010 |
| KR | 200361111 | Y1 | 9/2004 |
| KR | 10-2010-0081354 | A | 7/2010 |
| KR | 10-2011-0065338 | A | 6/2011 |
| WO | 9608892 | A1 | 3/1996 |
| WO | 2008050402 | A1 | 5/2008 |
| WO | 2012/127971 | A1 | 9/2012 |
| WO | 2013/182733 | A1 | 12/2013 |
| WO | 2019064453 | A1 | 4/2019 |
| WO | 2020/042755 | A1 | 3/2020 |
| WO | 2023/009477 | A1 | 2/2023 |

OTHER PUBLICATIONS

Texas Advanced Optoelectronic Solutions Inc., TCS230 Programmable Color Light-To-Frequency Converter, Dec. 2007, 12 pages.
Methven, Don, Wireless Video Streaming: An Overview, Nov. 16, 2022, 7 pages.
Outdoorlink, Inc., SmartLink One, One Relay, http://smartlinkcontrol.com/billboard/one-relay/, retrieved Apr. 17, 2019, 2007-16, 6 pages.
Outdoorlink, Inc., SmartLink Website User Manual, http://smartlink.outdoorlinkinc.com/docs/ SmartLinkWebsiteUserManual.pdf, 2017, 33 pages.
Outdoorlink, Inc., SmartLink One Out of Home Media Controller, 2016, 1 page.
Sigmasense, Analog can't touch Digital, https://sigmasense.com/, retrieved Jan. 23, 2019, 5 pages.
Sigmasense, Solutions, https://sigmasense.com/solutions/, retrieved Jan. 23, 2019, 4 pages.
Sigmasense, Technology, https://sigmasense.com/technology/, retrieved Jan. 23, 2019, 3 pages.
Turley, Jim, SigmaSense ICCI Goes Big, New Touch Technology Aimed at Big Screens, But That's Just for Starters, EEJournal, https://www.eejournal.com/article/sigmasense-icci-goes-big/, Jan. 8, 2019, 3 pages.

* cited by examiner

DISPLAY UNIT WITH MONITORING FEATURES

CROSS-REFERENCE TO RELATED APPLICATIONS

This application is a continuation of U.S. application Ser. No. 19/173,174 filed Apr. 8, 2025, which is a continuation of U.S. application Ser. No. 18/795,279 filed Aug. 6, 2024, now U.S. Pat. No. 12,298,614 issued May 13, 2025, which is a continuation of US application Ser. No. 18/654,191 filed May 3, 2024, now U.S. Pat. No. 12,117,684 issued Oct. 15, 2024, which is a continuation of U.S. application Ser. No. 18/377,401 filed Oct. 6, 2023, now U.S. Pat. No. 12,007,637 issued Jun. 11, 2024, which is a continuation of U.S. application Ser. No. 17/983,144 filed Nov. 8, 2022, now U.S. Pat. No. 11,815,755 issued Nov. 14, 2023, which is a continuation of U.S. application Ser. No. 17/201,933 filed Mar. 15, 2021, now U.S. Pat. No. 11,526,044 issued Dec. 13, 2022, which claims the benefit of U.S. provisional patent application Ser. No. 63/000,612 filed Mar. 27, 2020, the disclosures of each of which are hereby incorporated by reference as if fully restated herein.

TECHNICAL FIELD

Exemplary embodiments relate generally to systems and methods for monitoring operations of a display unit based on, at least in part, data from a shock sensor.

BACKGROUND AND SUMMARY OF THE INVENTION

Electronic displays have grown in popularity not only for indoor use, but also for outdoor use. One exemplary application, without limitation, is the digital out of home advertising market where the electronic displays are increasingly replacing the use of static posters. The use of electronic displays is advantageous because such electronic displays permit images to be changed quickly as well as permit the use of videos and interactive displays, among other benefits.

Such outdoor electronic displays experience solar loading. Such solar loading may result in significant heat loads to the electronic display and related components which may result in damage if not thermally managed properly. However, such thermal management efforts require the consumption of additional power. Ambient solar conditions also affect image quality. Electronic display brightness sometimes needs adjusted to make an image visible. The direction an electronic display is facing may affect the amount of solar loading or other exposure received by the electronic display, and thus affect the need to provide thermal management and/or brightness levels, for example. What is needed is a display unit which controls operations based on, at least in part, orientation of the display unit.

A display unit which controls operations based on, at least in part, orientation of the display unit is provided. The display unit may comprise a housing for one or more electronic displays. Such electronic displays, and other components of the display unit, may be cooled or otherwise thermally managed using fans, open loops for ambient air, and/or closed loops for circulating gas, for example. The display unit may comprise a controller. The controller may comprise one or more of: an orientation detection device, an accelerometer, a timekeeping device, a location tracking device, a database, and a sensor. The orientation detection device may comprise a magnetometer, though any type of orientation detection device is contemplated. The aforementioned components may be in electronic communication with a processor, which may be local to or remote from such components. The processor may receive readings from such components. From such readings, one or more of: the tilt angle of the unit, the location of the unit, the time of day, and/or the display unit's direction or other orientation may be determined. From such information, the solar angle relative to each electronic display may be determined. The display unit's operations may be adjusted based upon the solar angle. For example, without limitation, a number of predetermined ranges may be provided and the electronic display's brightness and/or speed of the cooling fans may be adjusted to predetermined criteria for each such range.

As another example, without limitation, such information (e.g., the tilt angle of the unit, the location of the unit, the time of day, and/or the display unit's direction or other orientation) may be used to determine whether or not a display unit is installed properly. For example, without limitation, such information may be used to determine approximate deviation from plumb.

Examples of other such sensors include vibration and/or shock sensors. Data from any of the orientation detection device, the accelerometer, the location tracking device, the vibration sensor, the shock sensor, combinations thereof, or the like may be used to detect damage to the display unit. Such damage may be, for example, without limitation, as a result of vandalism, vehicle collision, natural disaster, or the like. Where such possible damage is detected, such as by exceedance of an impact/shock level, the tilt angle and/or orientation may be determined and compared to expected measure to confirm such damage. Alerts may be provided where such possible damage is detected.

As another example, without limitation, such information (e.g., the tilt angle of the unit, the location of the unit, the time of day, and/or the display unit's direction or other orientation) may be used to determine whether or not a door or other access panel of the unit is opened or closed, assuming the sensor is mounted on or otherwise connected to the door or access panel.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
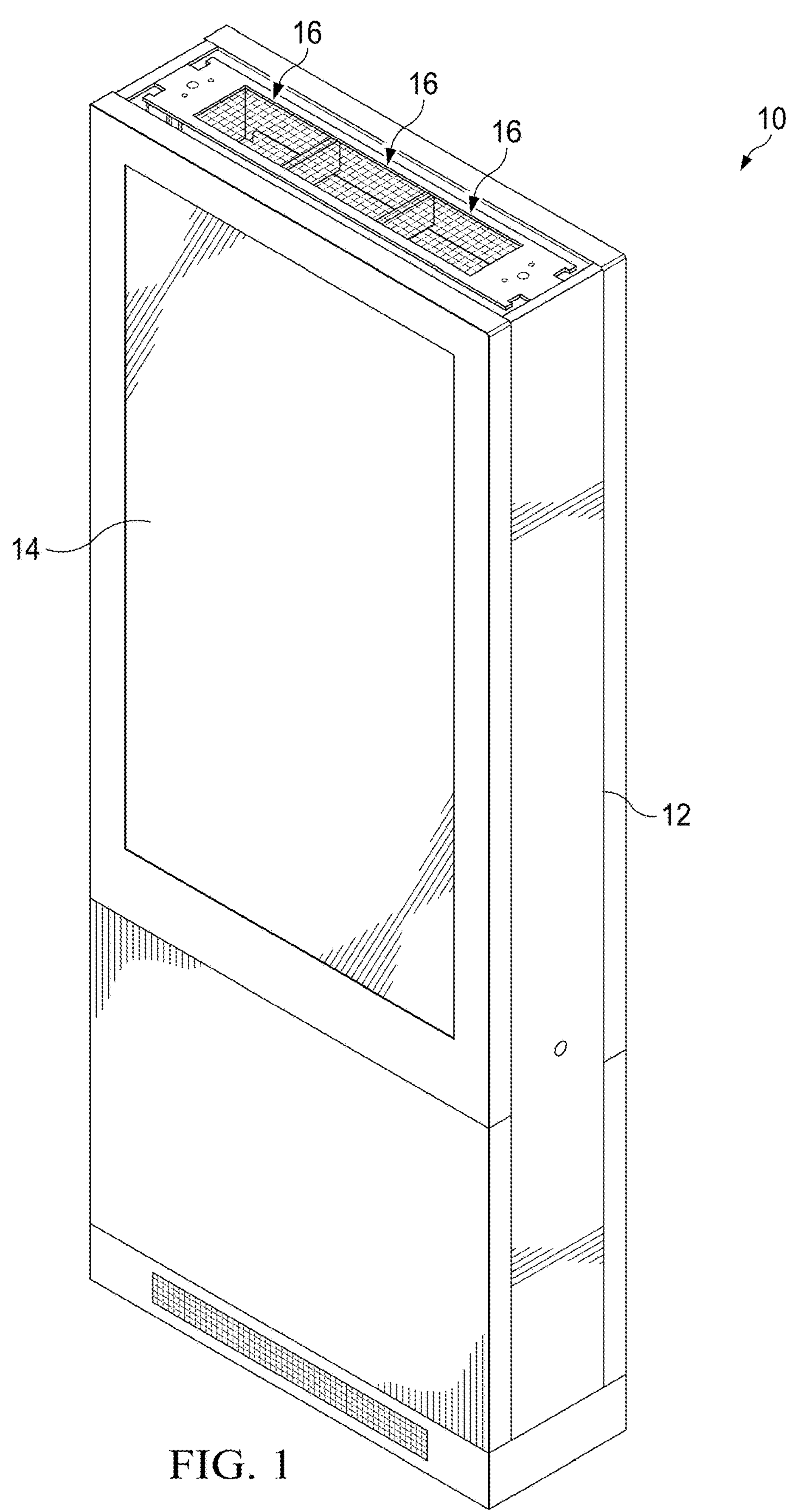
FIG. 1 is a perspective view of an exemplary display unit in accordance with the present invention.

FIG. 1 illustrates a display unit 10. The display unit 10 may comprise a housing 12. One or more electronic displays 14 may be located at the housing 12. The electronic display (s) 14 may be any type, such as, but not limited to, LED, LCD, OLED, rear projection, cathode ray tube, plasma, some combination thereof, or the like. The electronic displays 14 may be directly back lit, edge lit, emissive, passive, transflective, some combination thereof, or the like. The electronic displays 14 may be associated with one or more illumination elements, such as, but not limited to, a backlight, edge light, emissive elements, combinations thereof, or the like. In exemplary embodiments, a first electronic display 14 is positioned at the housing 12 in an opposing arrangement with a second electronic display 14. Any number of electronic displays 14 of any size, shape, location, and/or orientation may be utilized. The same of different types of electronic display 14 may be used in a display unit 10.

The display unit 10 may comprise one or more thermal management systems. The thermal management systems may be those shown and/or described in U.S. Pat. No. 10,499,516 issued Dec. 3, 2019, the disclosures of which are hereby incorporated by reference as if fully restated herein, for example, without limitation. For example, without limitation, one or more apertures 16 may be provided in the housing 12. The apertures 16 may serve as intake points or exhaust points for ambient air. The ambient air may travel through one or more open loop pathways within the housing 12. One or more closed loop pathways for circulating gas may also be located within the housing 12. The open loop pathways and closed loop pathways may thermally interact with one another, such as, but not limited to, at a heat exchanger. An open loop pathway, in exemplary embodiments, may extend along a rear surface of each of the electronic displays 14. A closed loop pathway, in exemplary embodiments, may encircle each of the electronic displays 14. One or more fans may be located along the open loop pathway, the closed loop pathway, some combination thereof, or the like.

Figure 2:
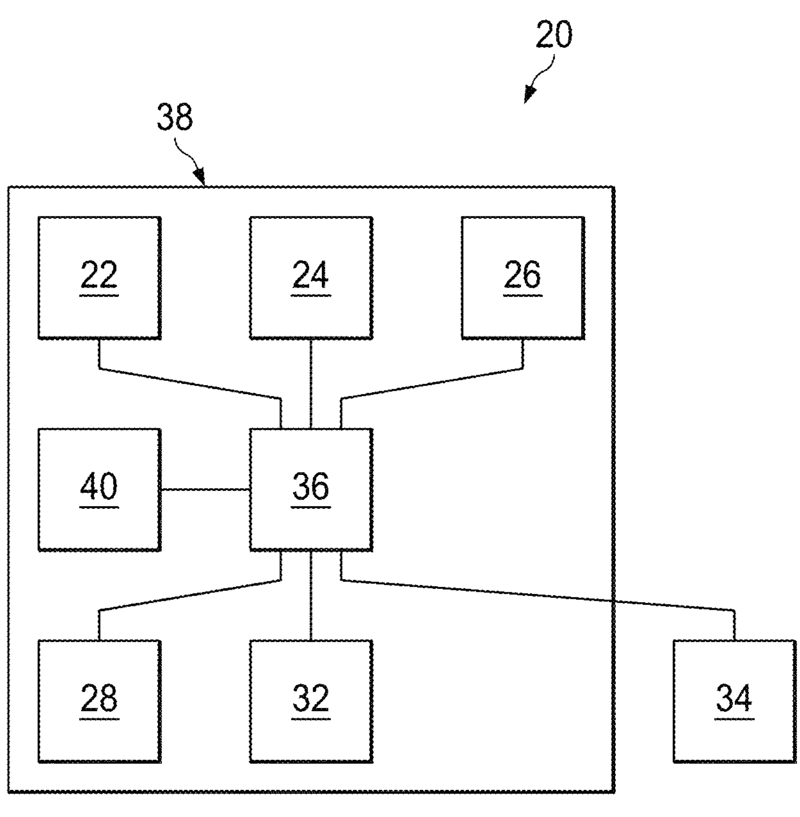
FIG. 2 is a simplified block diagram of an exemplary control unit for the display unit of FIG. 1.

FIG. 2 illustrates a controller 20 for use with the display unit 10. The controller 20 may be located within the housing 12, though any location, including, but not limited, to a remote location, may be utilized. The controller 20 may comprise one or more orientation detection devices 22. The orientation detection device(s) 22 may comprise a magnetometer, accelerometer, motion sensor, location tracking device, compass, gyroscope, some combination thereof, or the like. Other sensors 40 such as, but not limited to, shock and/or vibration sensors may be utilized and placed in electronic communication with the controller 20. The orientation detection device 22 may be configured to determine the direction of the orientation detection device 22, and thus the display unit 10, is facing. Such directional observations may be made in two-dimensions and/or three dimensions. Any kind or type of orientation detection device 22 is contemplated, and combination of such orientation detection devices 22 may be utilized. For example, without limitation, the orientation of the orientation detection device 22 relative to one or more other given components of the display unit 10 may be preprogrammed or known such that the orientation of such given component(s) may be determined from the orientation of the orientation detection device 22.

In exemplary embodiments, the orientation detection device 22 or other device may be located, oriented, calibrated, or otherwise configured to determine the orientation of at least one of the electronic displays 14. For example, without limitation, the orientation detection device 22 may be configured to determine the orientation of each electronic display 14. As another example, without limitation, the orientation detection device 22 may be configured to determine the orientation of the display unit 10 and the orientation of the electronic display(s) 14 may be determined from the known or preprogrammed orientation of the electronic display(s) 14 relative to the orientation detection device 22. As yet another example, without limitation, the orientation detection device 22 may be configured to determine the orientation of a particular one of the electronic displays 14 and the orientation of any remaining electronic display(s) 14 may be determined from the known orientation of the remaining electronic display(s) 14 relative to the orientation detection device 22.

The controller 20 may comprise one or more timekeeping device(s) 24, such as, but not limited to, a GPS receiver, a clock, stopwatch, timer, some combination thereof, or the like. The timekeeping device(s) 24 may be configured to track the time of day. The timekeeping device(s) 24 may be configured to, additionally or alternatively, track the date.

The controller 20 may comprise one or more inclinometers 26. The inclinometers 26 may be configured to determine the tilt angle of the display unit 10. In exemplary embodiments, the inclinometers 26 may be located, oriented, calibrated, or otherwise configured to determine the tilt angle of at least one of the electronic displays 14. The orientation detection device 22 in exemplary embodiments, without limitations, may serve as the inclinometers 26, though not required.

The controller 20 may comprise one or more location devices 28. The location devices 28 may be GPS devices, though any type of location tracking or determining device may be utilized. The location devices 28 may be configured to determine the location of the display unit 10.

In exemplary embodiments, the location tracking device of the orientation detection device 22 or otherwise may also serve as the timekeeping device 24. For example, without limitation, a GPS based device may provide location detection as well as time keeping.

The controller 20 may comprise one or more databases 32. The databases 32 may comprise solar position data such as, but not limited to, sunrise times, sunset times, solar intensity, solar path information, solar angle information, some combination thereof, or the like. The solar position information may be location, time, and/or date specific. Alternatively, or additionally, network communication devices may be provided to connect to one or more remotely located databases 32.

The one or more of the orientation detection devices 22, timekeeping devices 24, inclinometers 26, location devices 28, and/or databases 32 may be in electronic communication with one or more processors 36. The processors 36 may be in electronic communication with one or more thermal management components 34. Such thermal management components 34 may comprise one or more fans, illumination devices for the electronic displays 14 (e.g., LEDs), air conditioning devices, heat pumps, thermoelectric coolers, some combination thereof, or the like. The processor(s) 36 may be configured to receive data from such thermal management component(s) 34 such as, but not limited to, fan operation status, fan speed, air flow, temperatures, some combination thereof, or the like.

The various components of the controller 20 may be located within a controller housing 38, or may be located at one or more locations throughout the display unit 10, and/or may be located remote from the display unit 10. In exemplary embodiments, some components of the controller 20 may be located within the controller housing 38 and others may be located elsewhere, such as, but not limited to, remote from the display unit 10. Where at least some components of the controller 20 are remote from the unit 10, communication with the remaining components of the controller 20 and/or other components of the display unit 10 may be made by way of one or more network communication devices. In other exemplary embodiments, certain components of the controller 20 may not be required and instead may be predetermined, such as through user input. By way of a non-limiting example, the location of the display unit 10 may be predetermined, programmed, and/or provided such that the one or more location devices 28 are not required. Communication between any such components of the display unit 10 or remote therefrom may be accomplished by wired and/or wireless connection.

Figure 3:
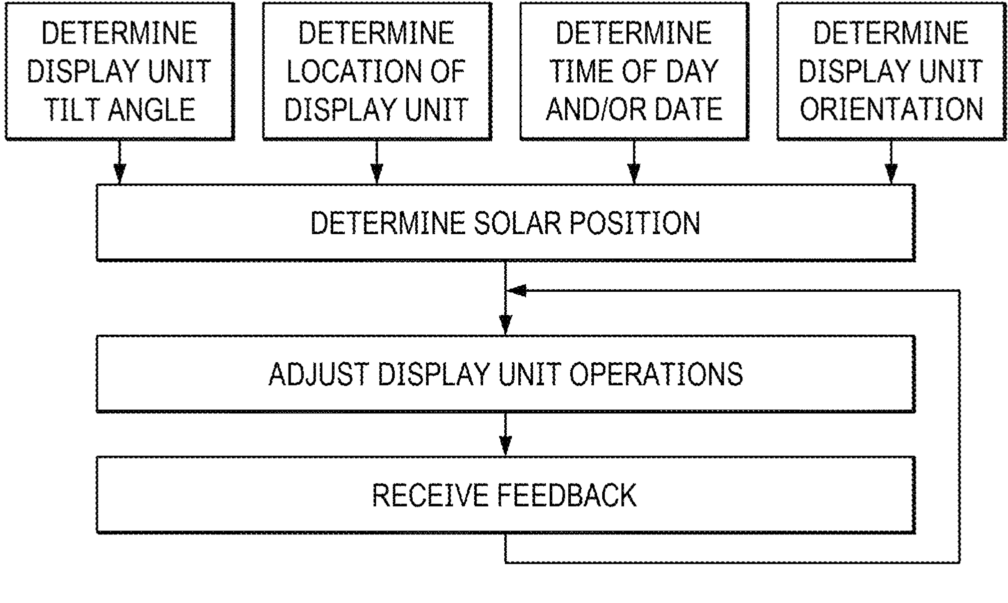
FIG. 3 is a flow chart with exemplary logic for use with the controller of FIG. 2.

FIG. 3 is a flow chart with exemplary logic for use with the controller 20. The tilt angle of the display unit 10 may be determined. In exemplary embodiments, the tilt angle may be determined from data received from the one or more inclinometers 26. Alternatively, or additionally, the tilt angle may be determined by the orientation detection device 22. The location of the display unit 10 may be determined. In exemplary embodiments, the location may be determined from data received from the one or more location devices 28, though the location may alternatively, or additionally, be preprogrammed. The time of day may be determined. In exemplary embodiments, the time of and/or date may be determined from data received from the one or more timekeeping devices 24. The direction the display unit 10 is facing may be determined. In exemplary embodiments, the direction the display unit 10 is facing may be determined from data received from the one or more orientation detection devices 22.

The solar position may be determined. The solar position may be measured by the solar angle. The solar angle may be determined relative to the display unit 10, a particular one of the one or more electronic displays 14, and/or each of the one or more electronic displays 14. The solar angle may be determined relative to other components of the display unit 10. The solar angle may be determined, in exemplary embodiments, by retrieving the solar data from the database 32 indicating the position of the sun for the location, the time of day, and/or the date. Additionally, the tilt angle of the display unit 10 may be used to determine the solar angle relative to the surface of each of the one or more electronic displays 14. By way of a non-limiting example, where the sun is located at 45 degrees relative to the horizon, and the display unit 10 and/or the electronic display 14 is located at 5 degrees upward angle relative to the horizon, the solar angle may be determined to be 40 degrees. Additionally, or alternatively, the direction of the display unit 10 may be used to determine the solar angle relative to the surface of each of the one or more electronic displays 14. By way of a non-limiting example, where back-to-back electronic displays 14 are utilized, the solar angle for a first one of electronic displays 14, which faces the sun, may be 20 degrees, while the solar angle for a second one of the electronic displays 14 may be zero and/or a negative, which faces away from the sun.

The determination of the solar angle may be used to adjust operations of the display unit 10. For example, without limitation, where the solar angle is likely to result in greater sun exposure and/or solar loading, the controller 20 may be configured to increase fan speed, increase brightness of the electronic displays 14, some combination thereof, or the like. This may improve cooling and/or image quality. Where, for example, without limitation, the solar angle is likely to result in reduced sun exposure and/or solar loading, the controller 20 may be configured to decrease fan speed, decrease brightness of the electronic display 14, some combination thereof, or the like. This may decrease power consumption.

Such determinations and alternations to display operations may be done based solely on solar angle or in conjunction with other data measures such as, but not limited to, ambient weather conditions, ambient lighting conditions, combinations thereof, or the like. For example, without limitation, weights may be applied to each factor and/or certain factors may be prioritized.

The solar angle may be measured relative to the horizon, a particular cardinal direction (e.g., north, south, east, or west), zenith, some combination thereof, or the like. The solar angle calculated may comprise the attitude, elevation, azimuth, zenith, some combination thereof, or the like. Solar angle may be measured using known or yet to be developed techniques.

Feedback may be received and operations of the display unit 10 may be further adjusted as needed. For example, without limitation, temperature readings may be taken from the thermal management components 34 to ensure temperatures are within predetermined ranges and fan speed may be increased or decreased accordingly. As another example, without limitation, illumination readings of illumination elements for the electronic displays 14 may be taken from the thermal management components 34 to ensure the electronic displays 14 are illuminated properly and illumination may be increased or decreased to meet predetermined criteria.

Figure 4:
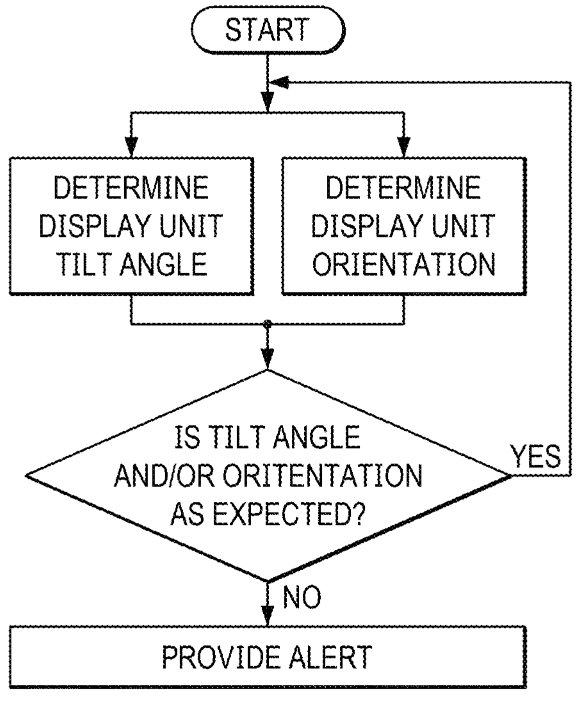
FIG. 4 is a flow chart with other exemplary logic for use with the controller of FIG. 2.

FIG. 4 illustrates other exemplary logic for the controller 20. Display unit 10 tilt readings from the inclinometer(s) 26 and/or orientation readings from the orientation detection device(s) 22 may be used to determine whether or not a display unit is installed properly. For example, without limitation, such information may be used to determine approximate deviation of the display unit 10 or components thereof from plumb or other predetermined design measure.

Data from the orientation detection device 22, the inclinometer(s) 26, and/or the other sensors 40 may be used to detect damage to the display unit 10. Such damage may be, for example, without limitation, as a result of vandalism, vehicle collision, natural disaster, or the like. For example, without limitation, certain readings from the other sensors 40, such as, but not limited to, shock and/or vibration sensors, may indicate damage to the unit 10. Following detection of such possible damage and/or as part of routine assessment, data from the orientation detection device 22 may be used to remotely confirm and/or assess the extent of such possible damage. In exemplary embodiments, where readings from the other sensors 40 indicate damage to the unit 10, data from the orientation detection device 22 may be automatically retrieved to confirm and/or assess the extent of such possible damage. For example, without limitation, if the tilt angle and/or orientation deviates from an expected parameter by more than a threshold, the existence of damage may be considered confirmed. The expected parameter may be a design parameter, last reading, a predetermined threshold, combinations thereof, or the like. If a finding of damage is confirmed, an electronic notification and/or data regarding the same may be sent to one or more remote devices.

Figure 5:
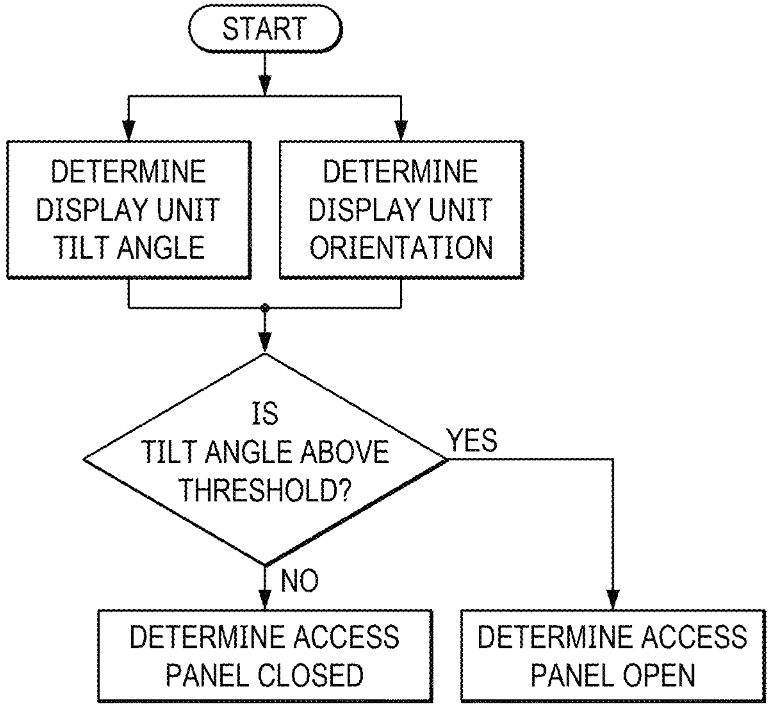
FIG. 5 is a flow chart with other exemplary logic for use with the controller of FIG. 2.

FIG. 5 illustrates other exemplary logic for the controller 20. Some or all of the orientation detection device 22 may be positioned on a particular part of the display assembly 10 to determine the position of the particular part of the display assembly 10 relative to a remaining or other portion of the display assembly 10. For example, without limitation, some or all of the orientation detection device(s) 22 may be placed in one or more access panels (e.g., door), side assemblies, or other framework comprising the electronic display 14, combinations thereof or the like, and may be used to determine whether or not such portion of the display unit 10 is in an opened or closed position. For example, such portions may be moveable relative to a frame, the housing 12, installation mount, or other structure which may be, directly or indirectly, installed at or otherwise connected to a ground surface, sidewalk, building, wall, vehicle roof, combinations thereof, or the like. In this way, the opened or closed nature of such portions may be determined relative to such a frame, housing 12, installation mount, or other structure. In exemplary embodiments, angles or orientations beyond a predetermined threshold (e.g., 10 degrees) may indicate the portion in an opened position. The predetermined threshold may be set relative to a fixed point (e.g., horizontal or vertical), or to an expected threshold (e.g., 0 degrees, 45 degrees, 90 degrees, etc.).

The display unit 10 may comprise one or more network connection devices. The network connection devices may facilitate connection to one or more intranets, internets, cellular networks, the world wide web, combinations thereof, or the like. With the location and/or time information from the location tracking device and/or the time keeping device as well as network connectivity, the display unit 10 may be configured to retrieve a number or various datapoints. Such datapoints may be received at the controller 20 and may be utilized to alter display operations. For example, without limitation, such datapoints may include near real time environmental conditions (e.g., relative humidity, wind speed/direction, barometric pressure, temperature, precipitation, cloud cover, solar intensity, UV index, sunset/sunrise times, combinations thereof, or the like). The controller 20 may use such data, by itself and/or in combination with the solar angle information, to control one or more thermal management components 34, such as, but not limited to, the fans, illumination devices, combinations thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing devices. The electronic devices may be personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A display assembly with monitoring features for digital out of home applications, said display assembly comprising:

a frame;

a display unit movably mounted to said frame for movement between the open position and the closed position, said display unit comprising an electronic display and an orientation detection device; and a controller for controlling at least certain operations of the display assembly including of said electronic display, said controller comprising the orientation detection device and a processor, wherein said controller is configured to:

determine, from time to time and at least in part by way of said processor a state of said display assembly based, at least in part, on data received from the orientation detection device, said state of said display unit including an indication as to whether the display unit is in the open position or the closed position.

2. The display assembly of claim 1 wherein:

the controller is configured to:

determine, from time to time and at least in part by use of said processor, an orientation of the display unit based, at least in part, on data received from the orientation detection device;

determine the display unit to be in the open position where the orientation meets a first set of one or more predetermined criteria; and determine the display unit to be in the closed position where the orientation meets a second set of one or more predetermined criteria or does not meet the first set of one or more predetermined criteria.

3. The display assembly of claim 2 wherein:

the open position includes movement of a lower edge of the display unit away from the frame; and the closed position includes placement of a rear of the display unit proximate to the frame.

4. The display assembly of claim 3 wherein:

the orientation detection device is located, at least in part, at a lower portion of the display unit.

5. The display assembly of claim 2 wherein:

the predetermined criteria comprises an expected threshold and a predetermined margin.

6. The display assembly of claim 5 wherein:
the expected threshold comprises a baseline orientation; and
the controller is configured to determine the baseline orientation based on data received from said orientation detection device when the display unit is known or indicated to be in the closed position.

7. The display unit of claim 5 wherein:
the data comprises azimuths; and
the expected threshold comprises a first azimuth.

8. The display unit of claim 5 wherein:
the data comprises elevations; and
the expected threshold comprises a first elevation.

9. The display assembly of claim 2 wherein:
the controller further comprises a timekeeping device; and
the controller is configured to generate an alert when the display unit is determined to be continuously in the open state for more than a predetermined period of time.

10. The display assembly of claim 9 wherein:
the alert comprises an electronic notification; and
said controller is configured to transmit said electronic notification to one or more remote devices.

11. The display assembly of claim 1 further comprising:
at least one of a shock sensor and a vibration sensor in electronic communication with said controller, and wherein said controller is further configured to:
receive data from said at least one of said shock sensor and said vibration sensor; and
query the orientation detection device for further data where the data received from said at least one of said shock sensor and said vibration sensor is above a predetermined threshold, wherein said further data is used to determine the state of the display assembly.

12. The display assembly of claim 11 wherein:
the controller is further configured to generate an alert where the data received from said at least one of said shock sensor and said vibration sensor is above said predetermined threshold and said further data from the orientation detection device is outside an expected range; and
said alert comprises an indication that the display assembly is damaged.

13. The display assembly of claim 12 wherein:
the controller is further configured to transmit the alert to at least one remote device.

14. The display assembly of claim 1 wherein:
the orientation detection device comprises at least one of a magnetometer, an accelerometer, a motion sensor, a location tracking device, compass, and gyroscope.

15. The display assembly of claim 1 wherein:
the controller is further configured to adjust operations of said display assembly based, at least in part, on the state determination.

16. The display assembly of claim 14 wherein:
the electronic display comprises a directly backlit liquid crystal type display;
the display unit comprises a thermal management subsystem comprising at least one airflow pathway and one or more fans located along the at least one airflow pathway; and
the operations adjusted by the controller comprise at least one of: adjusting a fan speed of said one or more fans, and adjusting an illumination level of the backlight.

17. The display assembly of claim 1 wherein:
the frame is configured for mounting to a ground surface in a fixed manner.

18. A display assembly with monitoring features for digital out of home applications, said display assembly comprising:
a frame;
a display unit movably mounted to said frame and comprising a housing, a liquid crystal type electronic display provided within the housing, and an orientation detection device connected to said housing, said display unit, including at least the housing, the liquid crystal type electronic display, and the orientation detection device, being movable relative to said frame between an open position where at least a portion of a rear surface of the display unit is moved away from the frame and a closed position where an entirety of the rear surface of the display unit is proximate to the frame;
a controller for controlling at least certain operations of the display assembly, Including of the liquid crystal type electronic display, said controller comprising the orientation detection device and a processor, wherein said controller is configured to:
determine, from time to time and at least in part by way of said processor, an orientation of the display unit based, at least in part, on data received from the orientation detection device;
determine, from time to time and at least in part by way of said processor, a state of the display unit based, at least in part, on the orientation, including by:
determining the display unit to be in the open position where the orientation meets a first set of one or more predetermined criteria; and
determining the display unit to be in the closed position where the orientation meets a second set of one or more predetermined criteria or does not meet the first set of one or more predetermined criteria; and
control at least certain operations of the display unit based, at least in part, on the orientation.

19. A display assembly with monitoring features for digital out of home applications, said display assembly comprising:
a frame;
a display unit movably mounted to said frame for movement between the open position and the closed position, said display unit comprising a housing, a directly backlit liquid crystal type electronic display provided within the housing and an orientation detection device connected to said housing, said display unit, including at least the housing, the liquid crystal type electronic display, and the orientation detection device being moveable relative to said frame between an open position where at least a lower edge of the display unit is moved away from the frame and a closed position where the rear of the display unit is proximate to the frame;
a thermal management subsystem comprising at least one airflow pathway extending, at least in part, within the display unit, and one or more fans located along the at least one airflow pathway; and
a controller for controlling at least certain operations of the display assembly including illumination levels of a backlight of the directly backlit liquid crystal type electronic display, content displayed at the directly backlit liquid crystal type electronic display, and at least certain operation of the thermal management subsystem, said controller comprising the orientation detection device and the processor, and wherein said controller is configured to:

determine, from time to time and at least in part by way of said processor, an orientation of the display unit based, at least in part, on data received from the orientation detection device;

determine the display unit to be in the open position where the orientation meets a first set of one or more predetermined criteria;

determine, from time to time and at least in part by way of said processor, a state of the display unit based, at least in part, on the orientation, including by:

determining the display unit to be in the open position where the orientation meets a first set of one or more predetermined criteria; and determining the display unit to be in the closed position where the orientation meets a second set of one or more predetermined criteria or does not meet the first set of one or more predetermined criteria; and control at least certain operations of the display unit and the thermal management subsystem based, at least in part, on the orientation.

* * * * *